(12) United States Patent
Schneider

(10) Patent No.: US 11,776,313 B2
(45) Date of Patent: Oct. 3, 2023

(54) SCANNING APPARATUS FOR REDUCING FIELD OF VIEW SEARCH SPACE

(71) Applicant: Gentex Corporation, Zeeland, MI (US)

(72) Inventor: Jim L. Schneider, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 401 days.

(21) Appl. No.: 16/707,333

(22) Filed: Dec. 9, 2019

(65) Prior Publication Data

US 2020/0184213 A1   Jun. 11, 2020

Related U.S. Application Data

(60) Provisional application No. 62/777,301, filed on Dec. 10, 2018.

(51) Int. Cl.
| | | |
|---|---|---|
| *H04N 5/33* | (2023.01) | |
| *G06V 40/19* | (2022.01) | |
| *G06V 40/18* | (2022.01) | |
| *G06V 10/25* | (2022.01) | |
| *G06V 10/143* | (2022.01) | |
| *G06V 20/00* | (2022.01) | |
| *B60R 25/25* | (2013.01) | |

(52) U.S. Cl.
CPC .............. *G06V 40/19* (2022.01); *B60R 25/25* (2013.01); *G06V 10/143* (2022.01); *G06V 10/25* (2022.01); *G06V 20/00* (2022.01); *G06V 40/197* (2022.01); *H04N 5/33* (2013.01)

(58) Field of Classification Search
CPC ........... G06K 9/00606; G06K 9/00617; G06K 9/2027; H04N 5/33; B60R 25/25
See application file for complete search history.

(56) References Cited

U.S. PATENT DOCUMENTS

| | | | |
|---|---|---|---|
| 5,928,572 | A | 7/1999 | Tonar et al. |
| 5,998,617 | A | 12/1999 | Srinivasa et al. |
| 6,020,987 | A | 2/2000 | Baumann et al. |
| 6,037,471 | A | 3/2000 | Srinivasa et al. |
| 6,137,620 | A | 10/2000 | Guarr et al. |
| 6,141,137 | A | 10/2000 | Byker et al. |
| 6,193,912 | B1 | 2/2001 | Thieste et al. |

(Continued)

FOREIGN PATENT DOCUMENTS

| | | |
|---|---|---|
| WO | 9842796 | 10/1998 |
| WO | 9902621 | 1/1999 |

(Continued)

*Primary Examiner* — Brian P Yenke
(74) *Attorney, Agent, or Firm* — Price Heneveld LLP; Brian James Brewer

(57) ABSTRACT

The disclosure provides for a scanning apparatus. The scanning apparatus may be configured to capture identifying information of a user and may comprise one or more infrared emitters, at least one image sensor configured to capture image data in a field of view, and a controller in communication with the scanning apparatus. The controller may be configured to activate the one or more infrared emitters, control the at least one image sensor to capture a first image in the field of view, deactivate the one or more infrared emitters, and control the at least one image sensor to capture a second image in the field of view.

11 Claims, 5 Drawing Sheets

(56) References Cited

U.S. PATENT DOCUMENTS

| | | |
|---|---|---|
| 6,241,916 B1 | 6/2001 | Claussen et al. |
| 6,249,369 B1 | 6/2001 | Theiste et al. |
| 6,519,072 B2 | 2/2003 | Nishikitani et al. |
| 6,617,564 B2* | 9/2003 | Ockerse ................ B60S 1/0822 250/227.25 |
| 7,683,326 B2* | 3/2010 | Stam ...................... G02B 23/12 250/341.1 |
| 8,736,689 B2 | 5/2014 | Sugimoto |
| 9,684,840 B2* | 6/2017 | Huang ................ G06V 10/141 |
| 9,852,519 B2* | 12/2017 | Wu ...................... G06V 10/143 |
| 10,139,179 B2* | 11/2018 | Downing ............... F41A 17/066 |
| 10,484,616 B2* | 11/2019 | Van Der Sijde ......... H04N 5/33 |
| 10,525,890 B2* | 1/2020 | Festerling, Jr ...... B60R 11/0235 |
| 10,556,568 B2* | 2/2020 | Boehm ................. B60R 25/04 |
| 10,616,218 B2* | 4/2020 | Boehm ............... H04L 63/0861 |
| 10,699,143 B2* | 6/2020 | Lintz ...................... A61B 5/18 |
| 10,733,437 B2* | 8/2020 | Weller ................. G06K 9/00604 |
| 10,745,018 B2* | 8/2020 | Abendroth ............ B60R 25/255 |
| 10,769,434 B2* | 9/2020 | Weller ................. G06K 9/00617 |
| 10,929,698 B2* | 2/2021 | Bosma .................. H04N 23/55 |
| 11,066,046 B2* | 7/2021 | Lintz .................... B60R 25/305 |
| 11,283,985 B2* | 3/2022 | Lintz ...................... B60R 11/04 |
| 11,295,553 B2* | 4/2022 | Bosma ................... G06V 40/67 |
| 11,468,710 B2* | 10/2022 | Schwetz ................ G02F 1/163 |
| 11,590,932 B2* | 2/2023 | Lintz ..................... B60R 25/25 |
| 2005/0105778 A1* | 5/2005 | Sung ................... G06V 40/166 382/218 |
| 2006/0223635 A1* | 10/2006 | Rosenberg ............ A63F 13/332 463/37 |
| 2008/0056568 A1 | 3/2008 | Porikli et al. |
| 2009/0201436 A1* | 8/2009 | Strazzanti ............ G09F 21/049 349/16 |
| 2009/0293589 A1* | 12/2009 | Freund ................. B60K 28/063 73/23.3 |
| 2012/0224019 A1* | 9/2012 | Samadani ................ H04N 9/09 348/14.01 |
| 2013/0016262 A1* | 1/2013 | Majewicz .......... H04N 5/23245 348/302 |
| 2013/0162798 A1* | 6/2013 | Hanna ..................... A61B 3/14 348/78 |
| 2013/0223681 A1* | 8/2013 | Lee .................... G06K 9/00899 382/103 |
| 2014/0362228 A1* | 12/2014 | McCloskey .......... G07D 7/1205 348/164 |
| 2014/0375821 A1* | 12/2014 | Wu ...................... G06V 10/143 348/164 |
| 2016/0366348 A1* | 12/2016 | Dixon .................... H04N 7/188 |
| 2017/0142312 A1* | 5/2017 | Dal Mutto ............ G06T 7/285 |
| 2017/0177935 A1* | 6/2017 | Weller ............... G06K 9/00617 |
| 2018/0097804 A1* | 4/2018 | Boehm ................ H04L 63/102 |
| 2018/0099612 A1* | 4/2018 | Weller ................. H04N 5/2254 |
| 2018/0222446 A1* | 8/2018 | Lock ...................... B60R 25/01 |
| 2018/0247037 A1* | 8/2018 | Weller ............... G06K 9/00892 |
| 2018/0260640 A1* | 9/2018 | Lintz ...................... A61B 5/18 |
| 2018/0276466 A1* | 9/2018 | Weller ................. G09G 3/3413 |
| 2018/0336664 A1* | 11/2018 | Ono ......................... H04N 25/63 |
| 2019/0182408 A1* | 6/2019 | Watanabe ............ G06V 10/751 |
| 2019/0287272 A1* | 9/2019 | Wu ........................ H04N 5/2354 |
| 2019/0295231 A1* | 9/2019 | Zhao .................... H04N 5/2256 |
| 2019/0389485 A1* | 12/2019 | Collins, II .......... G06K 9/00832 |
| 2020/0019775 A1* | 1/2020 | Lundy ................ G06K 9/00832 |
| 2020/0089165 A1* | 3/2020 | Delgado ............... A61B 5/0051 |
| 2020/0094780 A1* | 3/2020 | Lintz .................... B60R 25/305 |
| 2020/0134345 A1* | 4/2020 | Joshi ................. G06K 9/00906 |
| 2020/0154024 A1* | 5/2020 | Watson ................. A61B 1/0653 |
| 2020/0186701 A1* | 6/2020 | Lintz ................... H04N 5/2354 |
| 2020/0193132 A1* | 6/2020 | Schwetz ............. G06K 9/0061 |
| 2020/0193200 A1* | 6/2020 | Bosma ................ H04N 5/2254 |
| 2020/0203406 A1* | 6/2020 | Lee ................... H01L 27/14643 |
| 2021/0174106 A1* | 6/2021 | Bosma .................. G06V 20/56 |
| 2021/0339707 A1* | 11/2021 | Lintz .................... B60R 25/305 |
| 2021/0365702 A1* | 11/2021 | Edwards ................ G06V 10/60 |

FOREIGN PATENT DOCUMENTS

| | | |
|---|---|---|
| WO | 2004017088 A2 | 2/2004 |
| WO | 2013109609 A2 | 7/2013 |
| WO | 20180148197 A2 | 8/2018 |

* cited by examiner

SCANNING APPARATUS FOR REDUCING FIELD OF VIEW SEARCH SPACE

CROSS-REFERENCE TO RELATED APPLICATION

This application claims priority under 35 U.S.C. § 119(e) and the benefit of U.S. Provisional Application No. 62/777,301 entitled SCANNING APPARATUS FOR REDUCING FIELD OF VIEW SEARCH SPACE, filed on Dec. 10, 2018, the entire disclosure of which is incorporated herein by reference.

TECHNOLOGICAL FIELD

The present disclosure generally relates to a scanning apparatus and, more particularly, to a scanning apparatus operable to perform an eye-scan-identification function.

SUMMARY OF THE DISCLOSURE

According to one aspect of the present disclosure, a scanning apparatus is disclosed. The scanning apparatus may be configured to capture identifying information of a user and may include one or more infrared emitters, at least one image sensor configured to capture image data in a field of view, and a controller in communication with the scanning apparatus. The controller may be configured to activate the one or more infrared emitters, control the at least one image sensor to capture a first image in the field of view, deactivate the one or more infrared emitters, control the at least one image sensor to capture a second image in the field of view, compare the first image to the second image, determine a set of pixels having a change from the first and second field of view images, and process the set of pixels for identification of the user.

According to another aspect of the present disclosure, a scanning apparatus is disclosed. The scanning apparatus may include one or more infrared emitters, at least one image sensor configured to capture image data in a field of view, and a controller in communication with the scanning apparatus. The controller may be configured to modulate the one or more infrared emitters to activate and deactivate, control the at least one image sensor to capture a series of images in the field of view, compare the series of images in coordination with the modulation of the one or more infrared emitters, determine a set of pixels having a correlation with the modulation, and process the set of pixels for identification of the user.

According to yet another aspect of the present disclosure, a scanning apparatus is disclosed. The scanning apparatus may include one or more infrared emitters, at least one image sensor configured to capture image data in a field of view, and a controller in communication with the scanning apparatus. The controller may be configured to modulate the one or more infrared emitters to vary an intensity of illumination, control the at least one image sensor to capture a series of images in the field of view, compare the series of images in coordination with the modulation of the one or more infrared emitters, determine a set of pixels having a correlation with the modulation, and process the set of pixels for identification of the user.

These and other features, advantages, and objects of the present disclosure will be further understood and appreciated by those skilled in the art by reference to the following specification, claims, and appended drawings.

DETAILED DESCRIPTION

Figure 1:
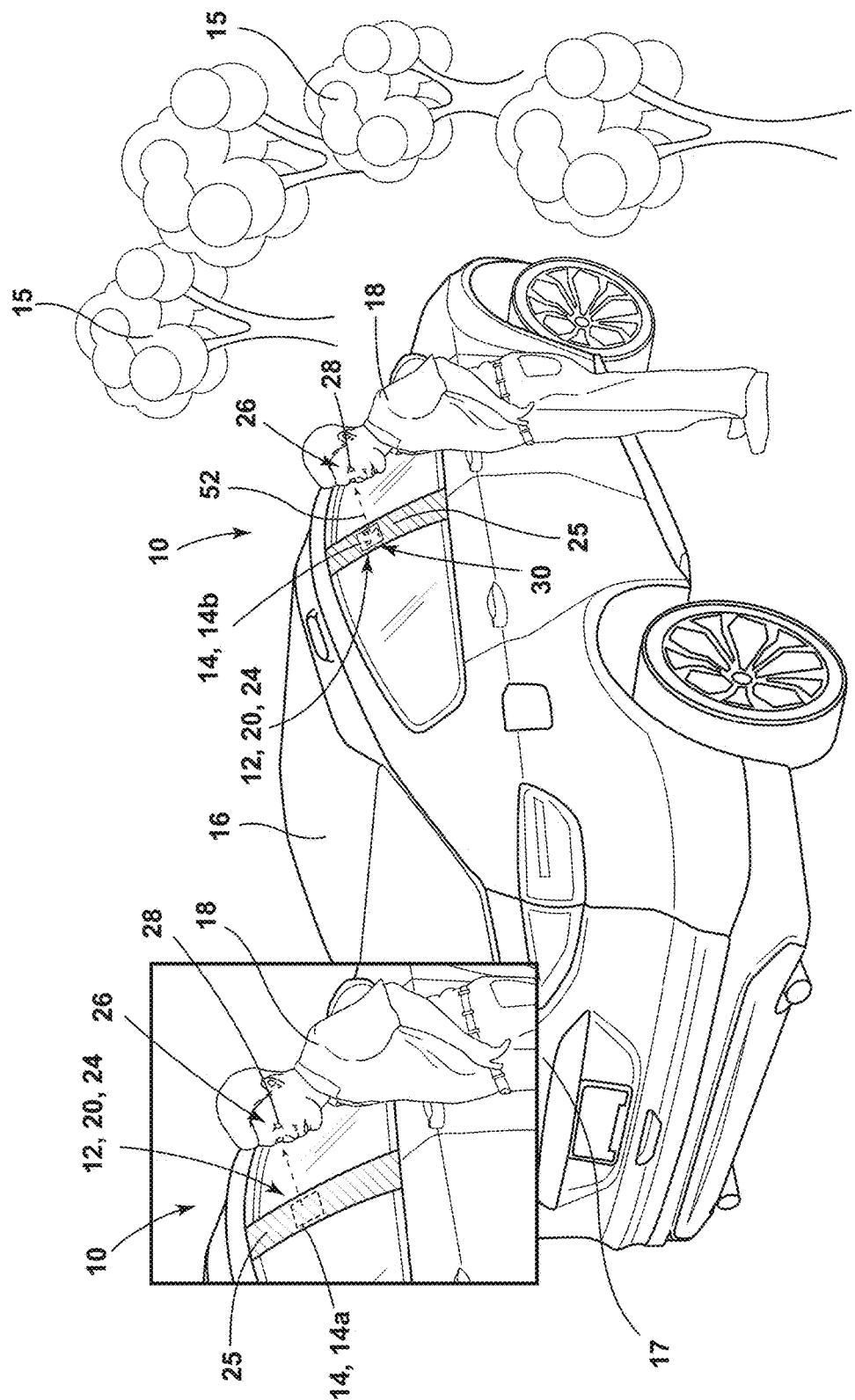
FIG. 1 is an illustrative view of an authentication system comprising a scanning apparatus incorporated in an automotive vehicle.

For purposes of description herein, the terms "upper," "lower," "right," "left," "rear," "front," "vertical," "horizontal," and derivatives thereof shall relate to the disclosure as oriented in FIG. 1. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
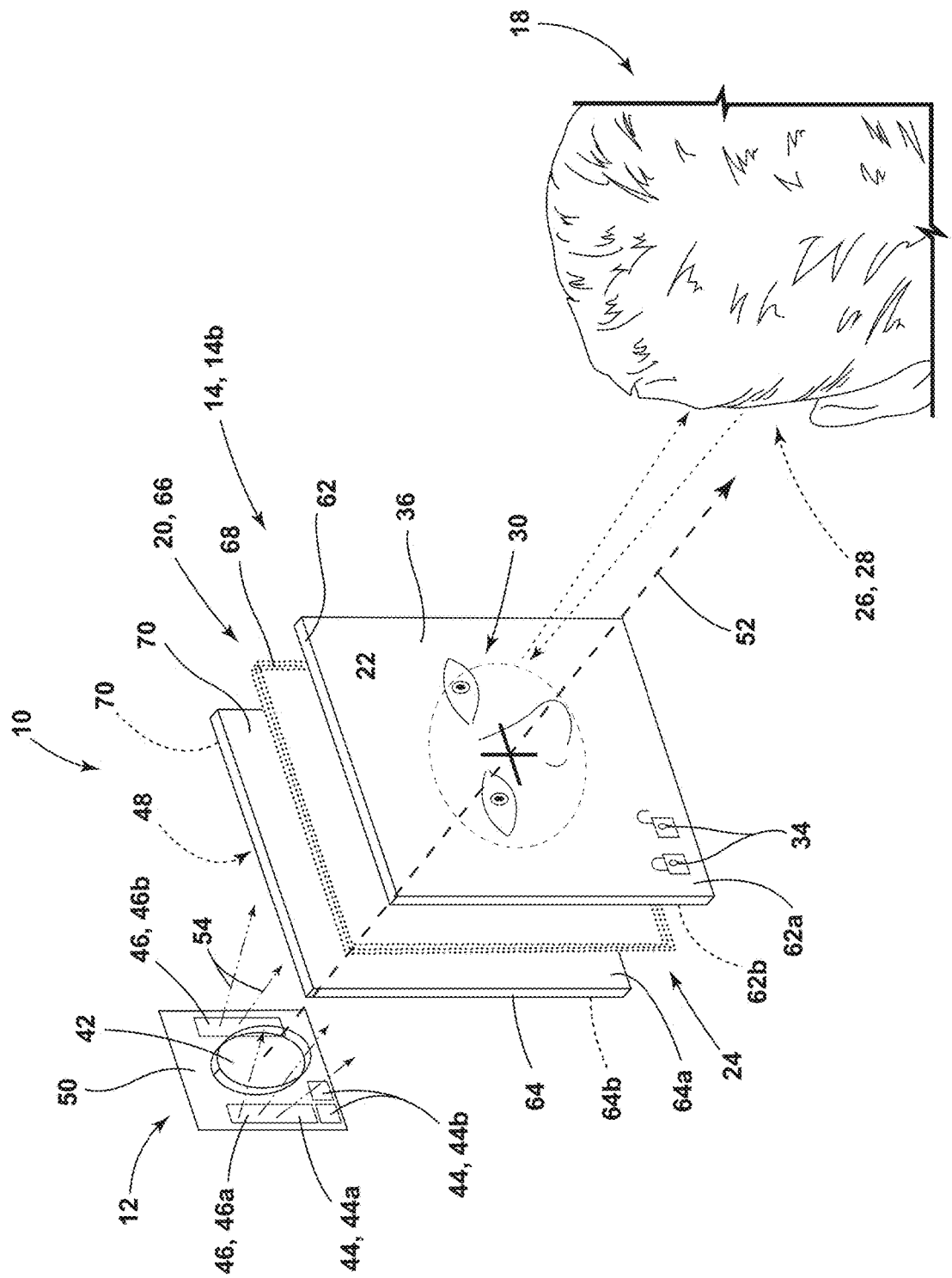
FIG. 2 is a cross-sectional view of a scanning apparatus.

Referring to FIGS. 1 and 2, the disclosure provides for an authentication system 10 comprising a scanning apparatus 12 operable to perform an identification function. The identification function may require the system 10 to search a field of view of the scanning apparatus 12 for identifying features. The identification function may correspond to an eye-scan-identification function, and an identifying feature may correspond to an iris. As demonstrated in FIG. 1, the system 10 may additionally comprise a concealment apparatus 14, which may be configured to selectively mask or hide the scanning apparatus 12 and/or a feedback apparatus. As shown in FIG. 1, the system 10 is incorporated in an automotive vehicle 16. However, the system 10 may be implemented in a variety of settings to provide authentication for access to barriers or entry doors, authorization of transactions (e.g. banking transactions, purchases, etc.), and various additional applications that may benefit from secure authorization of a user 18. Additionally, the concealment apparatus 14 may provide for the location of the scanning apparatus to be concealed to such that the appearance of the scanning apparatus 12 does not detract from the environment in which the system 10 is incorporated. In some embodiments, the concealment apparatus 14 may be configured to change from a concealed configuration 14a to a scanning configuration 14b.

The system 10 may be configured to reduce the field of view search space for identifying features. The field of view can include a region of a scene in which reflected light representing the scene is received. The field of view of the scanning apparatus 12 may include the user 18 as well as various natural and/or artificial elements or structures that are not useful in an identification function, or process. FIG. 1 illustrates a scene for the scanning apparatus 12 including the user 18 having a background that includes multiple trees 15. As the background including the trees 15 is not useful for the identification function, the system 10 may perform a subtraction filtering process that may be implemented by the scanning apparatus 12. The subtraction filtering process may include effectively removing a substantial portion of the background of the user 18 from the field of view of the scanning apparatus 12.

In some embodiments, the scanning apparatus 12 may be disposed or incorporated in various portions of the vehicle 16 to provide for access to various compartments or portions of the vehicle 16. In one example, the user 18 may be authorized to access a trunk 17 of the vehicle to receive a delivery or collect an item. In this way, the system 10 may provide for selective access through one or more gates, doors, access panels and may be additionally operable to provide an authorization for a user to complete various operations or transactions. Accordingly, the scanning apparatus 12 may be incorporated in various portions of the vehicle 16 (e.g. a pillar, trunk, spoiler, hood, roof, etc.) or various other structures for convenient incorporation in a variety of environments. In some examples, the scanning apparatus 12 may provide for an interior rearview mirror assembly configured to identify an operator of a vehicle based on the eye-scan identification function. The various beneficial aspects of the system 10 are further discussed in the following detailed description.

In operation, the scanning apparatus 12 may be operable to perform an identification function, which may be activated upon detection of the user 18 interacting or being detected proximate to the scanning apparatus 12. For example, when the user 18 approaches the vehicle 16. Once activated, a controller of the system 10 may control an electro-optic device 20 to change a transmittance of the concealment apparatus 14. In response to the activation, the controller may control an electrical signal (e.g. a voltage potential) applied to the electro-optic device 20 to change the electro-optic device 20 from a substantially opaque state in the concealed configuration 14a to a substantially transparent or light-transmissive state in the scanning configuration 14b. In this way, the controller may selectively reveal the location of the scanning apparatus 12 such that the user 18 may align one or more identifying features (e.g. a face, iris, fingerprint, palm print, and outline, etc.) with the scanning apparatus 12. Accordingly, the system 10 may be configured to be selectively revealed to the user 18 to process an authentication or identification routine.

In some embodiments, the concealment apparatus 14 may additionally comprise an alignment feature 22. The alignment feature 22 may be provided in the form of a mirror device 24, which may be selectively revealed in the scanning configuration 14b. The mirror device 24 may be incorporated or formed as a constituent layer of the electro-optic device 20 as shown in FIG. 2. The mirror device 24 may provide for a visual alignment tool for the user 18 to align a facial feature 26, eye 28, and/or various identifying features with the scanning apparatus 12. For example, the user 18 may view a reflection 30 of the identifying feature in the mirror device 24 to align the feature with the scanning apparatus 12. In some embodiments, the mirror device 24 may comprise one or more alignment features 22, as well as light indicators 34, which may assist the user 18 to align the reflection 30 of the identifying feature and indicate a status of the authentication processed by the system 10, respectively.

In the concealed configuration 14a, the system 10 may be configured to control the concealment apparatus 14 to match an appearance of a panel 25, which may be located neighboring or adjacent to the concealment apparatus 14. As shown in FIG. 1, the concealment apparatus 14 may be controlled by the controller of the system 10 to adjust a state of the electro-optic device 20 to a substantially opaque condition to achieve the concealed configuration 14a. In the concealed configuration 14a, an exterior surface 36 of the concealment apparatus 14 may be darkened to an opaque color, which may correspond to one or more chemical properties of an electro-optic medium 68 of the electro-optic device 20. In an exemplary embodiment, the electro-optic device 20 may be configured to transition from a black appearance in the concealed configuration 14a to a comparatively transparent appearance in the scanning configuration 14b. In this way, the controller of the system 10 may be configured to adjust the appearance of the exterior surface 36 to change from a colored appearance that substantially matches the panel 25 to a light transmissive state configured to reveal the mirror device 24. Accordingly, the system 10 may provide for the mirror device 24 to be selectively revealed to assist the user 18 in alignment with the scanning apparatus 12.

Referring now to FIG. 2, in some embodiments, the scanning apparatus 12 may provide for the system 10 to identify or authenticate the user 18 of a vehicle 16 based on the eye-scan identification function. The eye-scan-identification function may utilize an infrared illumination of an iris of the eye 28 in order to illuminate the eye 28 for the identification. Such illumination may be optimized in conditions allowing for a high optical transmittance in the near-infrared (NIR) range. In some embodiments, the disclosure may provide for an electrochromic (EC) stack of the electro-optic device 20 that may have a high light transmittance in the NIR range, for example, wavelengths of light ranging from 800 nm to 940 nm. In some embodiments, the range of wavelengths may comprise a range from approximately 700 nm to 940 nm. Additionally, in some implementations, the electro-optic device 20 may comprise a plurality of light sources 44 configured to illuminate at least one iris of the user 18 of the vehicle 16.

To provide for the eye-scan-identification function, for example, an iris scan, an image sensor 42 of the scanning apparatus 12 may be disposed proximate to a rear surface 48 of the electro-optic device 20. The image sensor 42 may correspond to, for example, a digital charge-coupled device (CCD) or complementary metal-oxide-semiconductor (CMOS) active pixel sensor, although it may not be limited to these exemplary devices. The image sensor 42 may be in communication with at least one light source 44, which may correspond to one or more infrared emitters 44a configured to output an emission 54 of light in the NIR range (e.g. 700 nm to 940 nm, 750 nm to 800 nm, etc.). In some embodiments, wavelengths ranging from 750 nm to 800 nm may be utilized for the emission or 750 nm to 800 nm to suit one or more iris recognition functions. In this configuration, the image sensor 42 may be configured to selectively activate the one or more infrared emitters 44a corresponding to the at least one light source 44 to illuminate the iris such that an identity of a user 18 of the vehicle 16 may be determined.

The infrared emitters 44*a* or the light sources 44 may correspond to a plurality of infrared emitter banks. Each of the infrared emitter banks 46 may comprise a plurality of light-emitting diodes, which may be grouped in a matrix or otherwise grouped and disposed behind the rear surface 48 of the electro-optic device 20. In an exemplary embodiment, the plurality of light sources 44 may correspond to a first emitter bank 46*a* and a second emitter bank 46*b*. In this configuration, each of the emitter banks 46 may be configured to output the emission 54 in the NIR range or other wavelengths of light from the exterior surface 36. In this configuration, the scanning apparatus 12 may be configured to illuminate the eye 28 or eyes of the user 18 such that the image sensor 42 may capture image data including details of the iris or irises.

In an exemplary embodiment, each of the first emitter bank 46*a* and/or the second emitter bank 46*b* may correspond to more or fewer LEDs or banks of LEDs. In some embodiments, the electro-optic device 20 and the mirror device 24 may have a high level of transmittance in the NIR range. Examples of electro-optic assemblies having a high level of transmittance in the NIR range may correspond to assemblies comprising the mirror device 24 having a transflective dielectric coating disposed on a fourth surface of the electro-optic device as further disclosed herein. In some embodiments comprising an electro-optic device 20 having a lower level of transmittance in the NIR range, the scanning apparatus 12 may utilize a greater number of or more intense LEDs. Electro-optic assemblies having a lower level of transmittance in the NIR range may correspond to assemblies comprising the mirror device 24 having a metal-based, transflective coating disposed on a third surface of the electro-optic device.

The image sensor 42 may be disposed on a circuit 50, for example, a printed circuit board in communication with a controller. The controller may further be in communication with various devices that may be incorporated in the vehicle 16 via the communication bus or any other suitable communication interface. The controller may correspond to one or more processors or circuits, which may be configured to process image data received from the image sensor 42. In this configuration, the image data may be communicated from the image sensor 42 to the controller. The controller may process the image data with one or more algorithms configured to determine an identity of the user 18 of the vehicle 16.

In some examples, the algorithm may include an image processing technique comprising an image subtraction process, or subtraction filtering process, to reduce the processing time by the controller. The image subtraction process can decrease the set of pixels on which to perform more extensive processing operations, thereby reducing the processing space of an entire field of view of the scanning apparatus 12. The controller may be configured to compare a set of consecutive images from the image sensor 42 and determine a portion of the field of view in the images desired for processing. Thus, the controller may filter, or ignore, for further consideration the remaining portion of the field of view in the images to reduce the workload of the algorithm.

In order to determine the portion of the field of view desired for processing, the image sensor 42 may modulate the one or more infrared emitters 44*a* to activate and deactivate to illuminate the scene, or field of view, in a pulsed, toggled, or blinking fashion. The image sensor 42 may capture consecutive images, or images captured over a predetermined time period. In some implementations, consecutive images may include sequential images that may be captured over a predetermined interval of time. A predetermined interval of time may be less than one second between frames, less than 500 milliseconds (ms), less than 100 ms, less than 20 ms, or less than 10 ms. The image sensor 42 may be configured to capture images or frames at rates including but not limited to 15 frames per second (FPS), 60 FPS, or 120 FPS. As the image sensor 42 may capture many images in a single second, the consecutive images can include images that are not successive, such that additional images can be captured between the consecutive images.

The consecutive, or sequential, images may correspond with the activation and deactivation of the one or more infrared emitters 44*a* and may be processed by the controller to determine significant scene changes. Significant scene changes may be generated by a pronounced response, or a reflection, of the one or more infrared emitters 44*a* on the nearby user 18. The image corresponding with the activation of the one or more infrared emitters 44*a* having the reflection can be compared to the analogous image corresponding with the deactivation of the one or more infrared emitters 44*a*. The controller may determine a pronounced response area, or set of pixels, in the image corresponding with the activation of the one or more infrared emitters 44*a* and perform the image subtraction technique such that the approximate location of the nearby subject can be determined as the set of pixels, or portion of the field of view, desired for processing. In this way, the pronounced response area includes a set of pixels with change. Further detailed discussion of the controller and the various devices that may be in communication therewith are discussed in reference to FIG. 3.

Still referring to FIG. 2, the alignment feature 22 may be formed as a portion of the mirror device 24 and may be visible by the user 18 viewing the exterior surface 36 of the concealment apparatus 14 in the scanning configuration 14*b*. In this configuration, a field of view of the image sensor 42 may be directed in a detection direction 52 configured to capture reflected light from detection emissions 54 output from the infrared emitters 44*a*. The alignment feature 22 may be aligned with the field of view of the image sensor 42 along the detection direction 52 such that the user 18 may align the identifying feature (e.g. the facial feature 26, eyes 28, etc.) with the field of view of the image sensor 42 by aligning the reflection 30 of the identifying features with the mirror device 24. The alignment feature 22 may correspond to one or more shapes or patterns that may be visible in the reflection 30. In an exemplary embodiment, the alignment feature 22 may be etched or laser ablated into the mirror device 24. In this configuration, the system 10 may provide for visible markers on the exterior surface 36 enabling the user 18 to align the identifying features (e.g. the facial features 26, eyes 28, etc.).

The light indicators 34 may be in communication with the controller and configured to output a signal to identify a state of the scanning apparatus 12. The indicator 34 may correspond to or be aligned with the light sources 44, which may correspond to visible light sources 44*b*. The visible light sources 44*b* may be operable to flash and/or change colors to communicate a state of the scanning apparatus 12. In an exemplary embodiment, the indicators 34 may be aligned with one or more etched or laser-ablated portions of the mirror device 24 such that visible light from the visible light sources 44*b* may pass through the mirror device 24 and illuminate the indicators 34. The visible light sources 44*b* may comprise light-emitting diodes (LED), and, in an exemplary embodiment, the visible light sources 44*b* may correspond to a red, green, and blue (RGB) LED operable to identify the state of the scanning apparatus 12 by outputting one or more colored emissions of light.

As illustrated in FIG. 2, the mirror device 24 may form a portion of the electro-optic device 20. The mirror device 24 may include a first substrate 62 having a first surface 62*a* and a second surface 62*b*. The mirror device 24 may further comprise a second substrate 64 having a third surface 64*a* and a fourth surface 64*b*. The first substrate 62 and the second substrate 64 may be in a parallel, spaced apart relationship defining a cavity 66 between the first and second substrates 62, 64. The first surface 62*a* and the third surface 64*a* may be oriented toward the exterior surface 36 of the concealment apparatus 14. The second surface 62*b* and the fourth surface 64*b* may be oriented toward the rear surface 48. In this configuration, the contents of the housing including the image sensor 42 and the light source(s) 44 may be significantly hidden from view by the concealment apparatus 14.

The cavity 66 may contain an electro-optic medium 68, such as, but not limited to, an electrochromic medium. The cavity 66 may be completely or partially filled with the electro-optic medium 68. The concealment apparatus 14 may be in communication with a dimming controller via electrical contacts and may comprise various seals to retain the electro-optic medium 68 in the cavity 66. In this configuration, the concealment apparatus 14 may correspond to an electrochromic mirror element configured to vary in reflectivity in response to a control signal received from the dimming controller via the electrical contacts. The control signal may change an electrical potential supplied to the concealment apparatus 14 to control the reflectivity. In some embodiments, the mirror device 24 may be implemented as a transflective coating 70, which may typically be disposed on the third surface 64*a*. The transflective coating 70 may typically comprise a layer containing silver along with additional layers, such as metal, dielectric, and/or transparent conducting oxides located above or below the silver comprising layer or both.

In some embodiments, the transflective coating 70 may be implemented as a transflective dielectric coating that may be applied to the fourth surface 64*b*. The transflective dielectric coating may be used as an alternative to a metal-based coating for the transflective coating 70. The transflective dielectric coating may be designed to resolve the issues related to the limited transmission in the NIR range for the concealment apparatus 14 and provide NIR transmittance greater than about 20%. The dielectric coating is designed to attain a reflectance level comparable to industry standard, i.e., about 40% to 85%, or about 50% to 75%, or about 55% to 70%. Additionally, the dielectric coating can be designed to attain a neutral color appearance in the visible color range for normal incidence viewing angle up to broad viewing angles. In this way, the disclosure provides for improved transmittance in the NIR range while maintaining visible color performance and mirror functionality.

Figure 3:
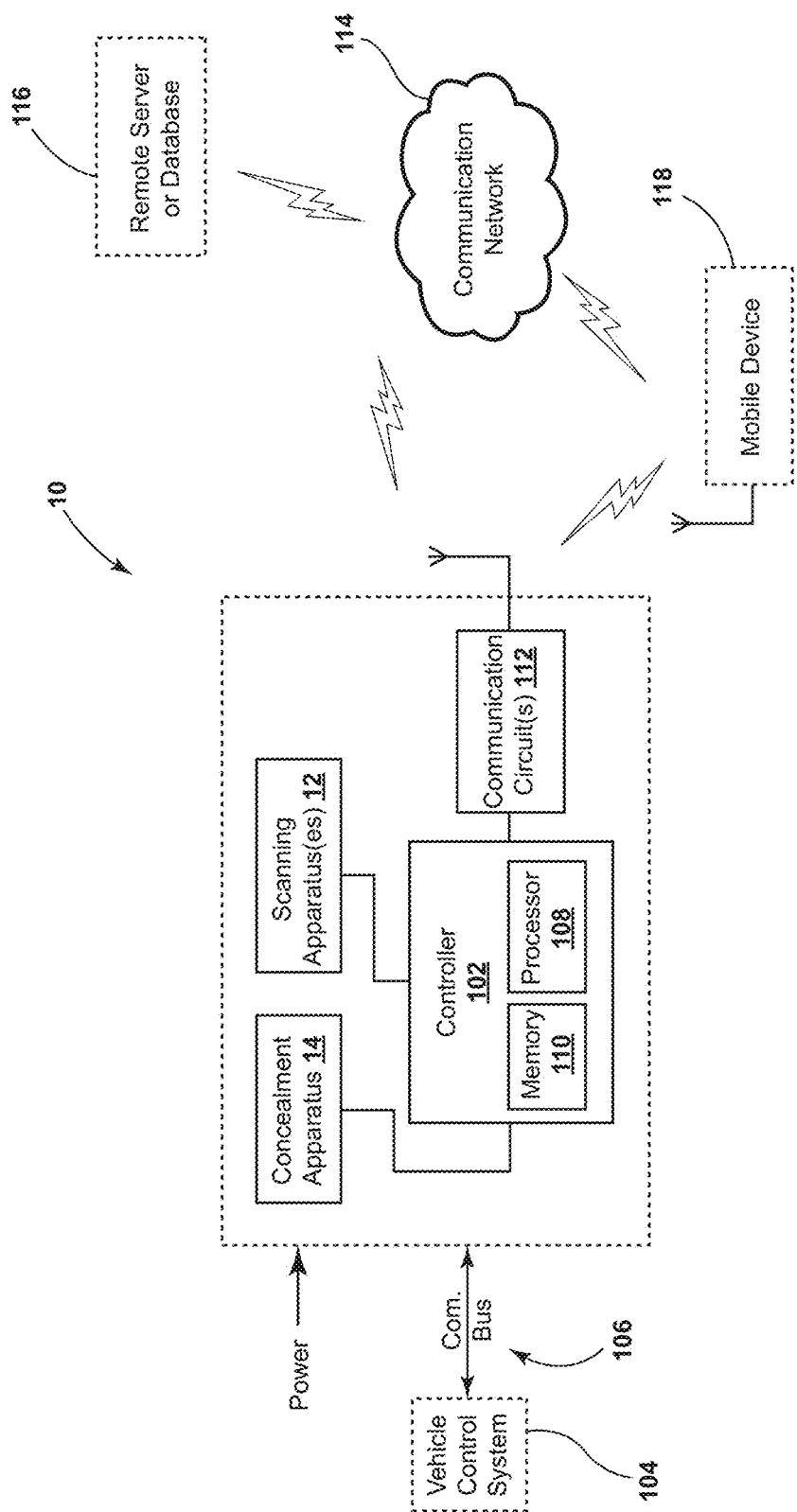
FIG. 3 is a block diagram of an identification system incorporating a scanning apparatus disposed in a mirror assembly in accordance with the disclosure.

Referring now to FIG. 3, a block diagram of the system 10 incorporating the scanning apparatus 12 is shown. In FIG. 3, the controller 102 of the system 10 is shown in communication with one or more of the scanning apparatuses 12 and the concealment apparatus 14. The controller 102 may further be in communication with a control module 104 via a communication bus 106 of the vehicle 16. The communication bus 106 may be configured to deliver signals to the controller 102 identifying various states of the vehicle 16. For example, the communication bus 106 may be configured to communicate to the controller 102 a drive selection of the vehicle 16, an ignition state, a door open or ajar status, a remote activation of the scanning apparatus 12, etc. Such information and control signals may be utilized by the controller 102 to activate or adjust various states and/or control schemes of the scanning apparatus 12 and the concealment apparatus 14.

The controller 102 may comprise a processor 108 having one or more circuits configured to control various operations of the system 10. The processor 108 may be in communication with a memory 110 configured to store instructions to control operations of the scanning apparatus 12. For example, the controller 102 may be configured to store one or more characteristics or profiles utilized by the controller 102 to identify the user 18 of the vehicle 16. In this configuration, the controller 102 may communicate operating and identification information with the scanning apparatus 12 to identify the user 18 of the vehicle 16. Additionally, based on the identification of the user 18, the controller 102 may be configured to control and/or communicate with additional systems of the vehicle 16. Such systems may include a security system, speed governor, radio/infotainment system, etc. In this way, one or more systems of the vehicle 16 may be controlled or restricted based on the identity of the user 18.

In some embodiments in response to an identification of a passenger or user 18 of the vehicle 16, the controller 102 may access a database of stored driver preferences to customize aspects of the vehicle 16. For example, the controller 102 may access and enable radio station presets according to a driver's pre-established preferences. Navigation and/or map display settings may be changed or set according to a driver's pre-established preferences. Additionally, the system 10 may be utilized to customize a seat position or height and adjust various operating parameters before the user 18 even enters the vehicle 16. For example, the system may be operable to start the vehicle 16 and activate a radio to a preconfigured station or playlist, and activate a climate control to a user setting. Additionally, the database may comprise navigation information comprising known or previously visited locations. In particular, a route to home, work, or other frequently visited locations may be preset upon identification of a driver based on previous use or programming stored in the database.

In an exemplary embodiment, the controller 102 may be configured to process image data received from the image sensor 42. In this configuration, the controller 102 may process the image data with one or more algorithms configured to determine an identity of the user 18 of the vehicle 16. Determining the identity of the user 18 may include the image subtraction technique for reducing the processing time of the processor 108. In this way, the controller 102 can initially process image data and determine a portion of the image data, or a set of pixels, desired to perform more extensive processing operations, such as eye detection and locating. Moreover, the image sensor 42 may include a graphic resolution of less than approximately 10 megapixels and effectively identify the user 18. With the identity of the user 18 or one or more passengers of the vehicle 16 identified, the controller 102 may further be operable to control various systems or functions of the vehicle 16.

Figure 4:
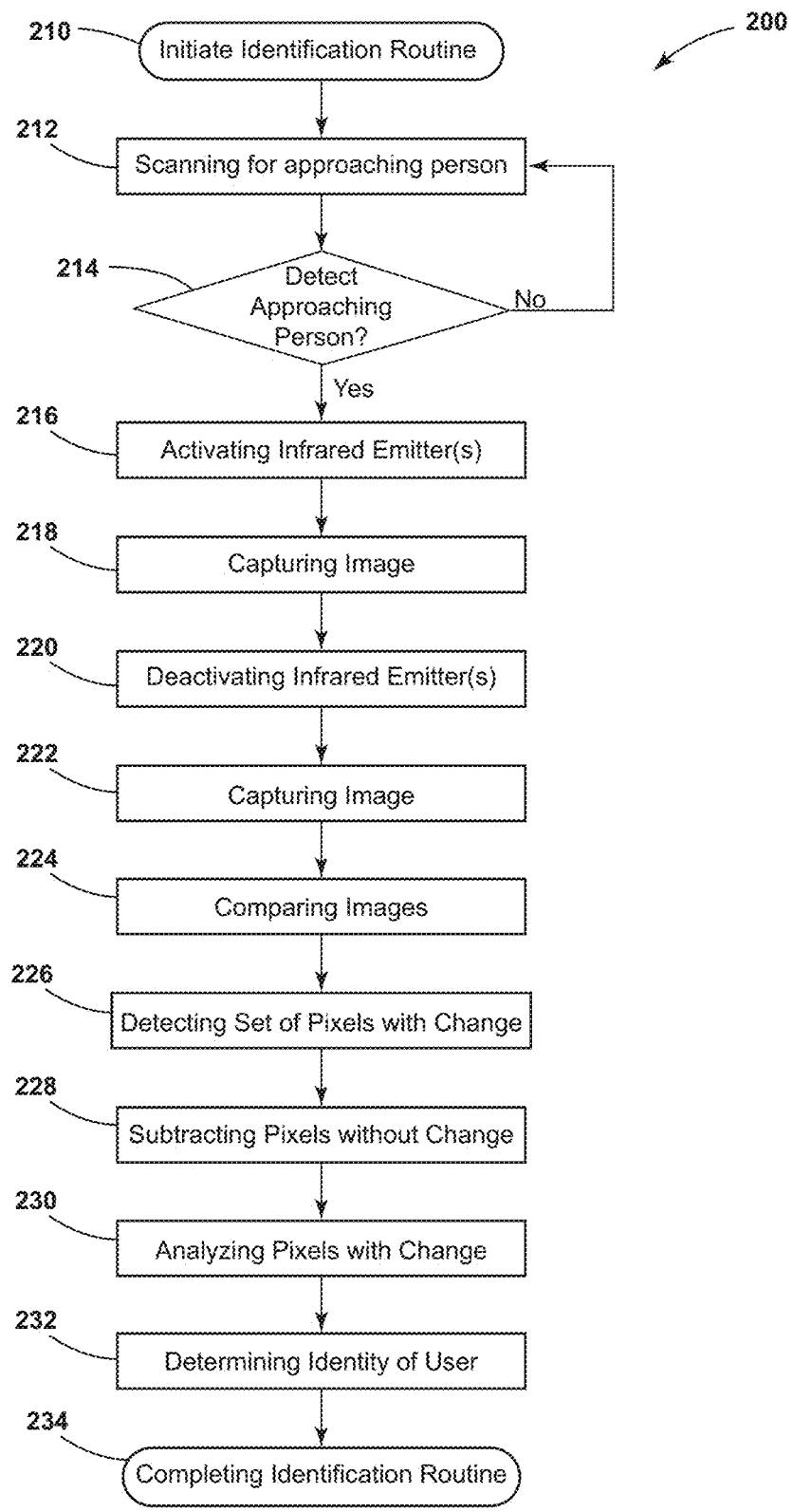
FIG. 4 is a flowchart demonstrating a method of determining a set of pixels for further processing.

Referring now to FIG. 4, a flowchart demonstrating a method 200 for determining a set of pixels for further image processing is shown. The method 200 may begin with the controller 102 of the system 10 initializing an identification routine (210). The method 200 may continue by scanning a region proximate the scanning apparatus 12 for the user 18 (212). The controller 102 may utilize the image sensor 42 or various sensors of the vehicle 16. If the user 18 is not detected in step 214, the controller 102 may continue the scan in step 212. If the user 18 is detected in step 214, the controller 102 may continue to step 216 and illuminate, or activate, the one or more infrared emitters 44a. The controller 102 may activate the scanning apparatus 12 and capture a first image in the field of view of the image sensor 42 (218).

Once the first image in the field of view of the image sensor 42 has been captured at step 218, the controller 102 may deactivate the one or more infrared emitters 44a (220) and capture a second image in the field of view of the image sensor (222). The images captured in steps 218 and 222 may have timestamps close in time such that the field of view is substantially the same. Furthermore, steps 218 and 222 can include capturing multiple images. In step 224, the controller 102 may compare the images captured in steps 218 and 222 in coordination with the modulation of the infrared emitters 44a and detect a changed set of pixels having a correlation with the modulation from the first image to the second image. A changed set of pixels can be caused by a reflection of the one or more infrared emitters 44a and may represent a location of the user 18. The controller 102 may subtract the set of pixels without change (228) from the captured field of view in order to decrease the number of pixels for further processing. In this way, the set of pixels with change remain for further processing. However, it is also within the scope of the disclosure that the set of pixels with change are subtracted from the set of pixels without change and the subtracted set of pixels with change are further processed. The controller 102 may process the pixels depicting or capturing the reflection, or change (230), and determine an identity of the user 18 (232). In some examples, the pixels capturing the reflection of the IR light depict a face and/or body of the user 18. Furthermore, determining an identity of the user 18 (232) includes executing an eye-scan-identification function on the determined location of the user 18. Following step 232, the method 200 may conclude in step 234.

While the method 200 is described as including steps 210-234, it is possible for the method 200 to include additional or fewer steps. For example, the method 200 may detect a set of pixels with a reflection, or change, in step 226 and continue directly to step 230 without subtracting the pixels without change in step 228. The method 200 may also repeat steps 216-222 in order to capture additional images, which may comprise more than two consecutive images for comparing in step 224. Thus, the method 200 may include capturing a series of images in coordination with the modulation of the active illumination source, such as the one or more infrared emitters 44a.

An additional step in the method 200 may include determining an average relative intensity of the illumination of the one or more infrared emitters 44a for each of the captured images, which may include images captured in a series. A further additional step in the method 200 may include analyzing the captured images and determining a set of pixels having a correlation with a known state of illumination, which may include varying the intensity of illumination periodically, or over a period of time. As described herein, the correlation with the known state of illumination may denote a measure of a temporal relationship of a controlled illumination of the one or more infrared emitters 44a to a measured reflection of light output from the one or more infrared emitters 44a. In this way, the measured reflection of light output may increase with increased intensity of illumination of the one or more infrared emitters 44a. A first set of pixels having a high correlation may include a set of pixels with a high level of measured reflection when the one or more infrared emitters 44a are illuminated at a higher intensity. A second set of pixels having a low correlation, which may be associated with the same or a different image, may include a set of pixels with a low level of measured reflection when the one or more infrared emitters 44a are illuminated at higher intensity. In some examples, the first set of pixels and the second set of pixels are corresponding pixels such that the reflections of the same pixels are compared to multiple states of illumination. Additionally, a set of pixels having a high level of measured reflection during a state of low intensity illumination, or zero illumination, may correspond to a set of pixels having a low, or negative correlation.

In some examples, varying the intensity of the illumination of the one or more infrared emitters 44a infrared emitters 44a can include sinusoidally varying the intensity of illumination with a period of 4.5× that of the frame rate of the image sensor 42. Determining a set of pixels having a correlation with a known state of illumination may include evaluating a corresponding set of pixels over the course of a series of frames (e.g. nine frames) and determining a correlation greater than a predetermined threshold correlation. A set of pixels having a correlation greater than the predetermined threshold correlation can be considered within an illumination zone of influence and therefore a possible subject of interest, or a set of pixels desired for further processing. Determining an illumination zone of influence may include comparing a first set of pixels with a first state of illumination and a second set of pixels with a second state of illumination to determine a correlation of illumination. Determining the illumination zone of influence may include comparing the first set of pixels with the first state of illumination emitted during capture of a first image and the second set of pixels with the second state of illumination. The second state of illumination may have a different intensity than the first state of illumination, which may be controlled and therefore known or tracked by the controller. Accordingly, based on the relationship between the first state of illumination detected in the first image and the second state of illumination detected in the second image, the controller may determine a correlation of the illumination. Based on the correlation, the controller may determine a set of pixels with change from the first image to the second image. Therefore, a strength of the relationship of a change of pixel intensity with a change in illumination state over at least two images may be measured by the controller. Stated another way, the correlation may indicate a relationship of a reflection from the one or more infrared emitters with a state of illumination over a series of images.

Furthermore, the steps in the method 200 may occur in an order other than the order illustrated in FIG. 4. For example, the image sensor 42 may capture an image in the field of view prior to activating the one or more infrared emitters 44a as in step 216. Additionally, the images captured in steps 218 and 222 may occur over a predetermined temporal period and may not necessarily be successive frames captured by the image sensor 42.

Figure 5C:
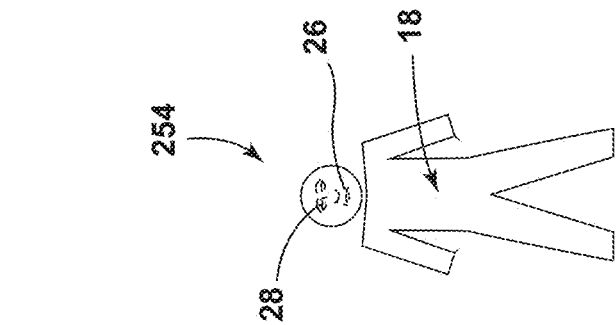
FIG. 5C is an illustrative view of the method of determining a set of pixels of FIG. 4.
Figure 5B:
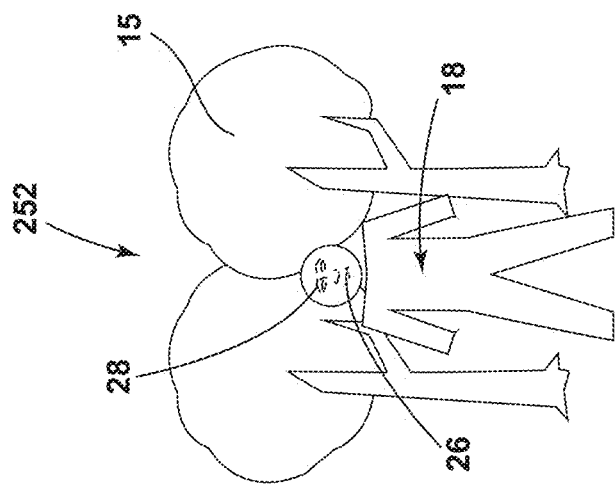
FIG. 5B is an illustrative view of the method of determining a set of pixels of FIG. 4.
Figure 5A:
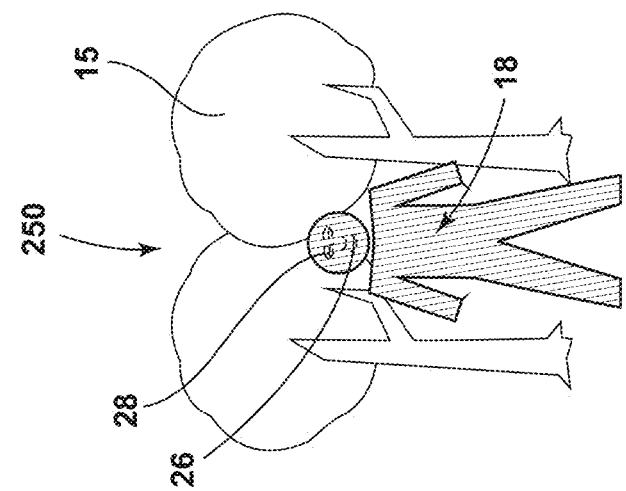
FIG. 5A is an illustrative view of the method of determining a set of pixels of FIG. 4.

FIGS. 5A-5C are illustrative of the method 200 of determining a set of pixels according to various aspects described herein. FIG. 5A represents a first image 250 in the field of view captured at step 218 having a reflection on the user 18 from the one or more infrared transmitters 44a activated at step 216. FIG. 5B represents a second image 252 in the field of view captured at step 222, which does not contain a reflection as the one or more infrared transmitters 44a have been deactivated at step 220. The controller 102 may then compare consecutive images 250, 252 having a substantially similar field of view, which may including comparing the first and second images. The set of pixels having the change, or pronounced response, can be detected. FIG. 5C schematically represents step 228 of the method 200 where the pixels without the change have been subtracted, or filtered, and can be ignored for further consideration by the system 10. In some examples, the pixels without change include pixels representing the trees 15. Therefore, an image 254 represents a reduced set of pixels for processing by the controller 102, compared with images 250, 252. Reducing the number of pixels which require further processing by the controller 102 reduces the processing requirements necessary to identify a portion of the image including or depicting the user 18. Stated another way, the method 200 reduces the number of pixels to be searched for locating the iris of the eye 28 for identification of the user 18. However, it is also within the scope of the disclosure that the set of pixels with change are subtracted from the set of pixels without change and the subtracted set of pixels with change are further processed.

Though discussed in exemplary reference to the vehicle 16, the system 10 may similarly be implemented to authenticate users to control access or entry through doors or access gates into various buildings, office structures, residences, etc. Similarly, the system 10 may be utilized to authorize various transactions (e.g. purchases, bank transactions, etc.). For example, in a residential setting, the system 10 may be in communication with a smart home system. In such embodiments, based on an authentication of the user 18, the system 10 may grant access to a door or gate of a home and control one or more devices in communication with the smart-home system to load specific settings or preferences of the user 18. Accordingly, the system 10 may be configured to suit a variety of applications without departing from the spirit of the disclosure.

Referring now to FIG. 3, the controller 102 may utilize the identification of the user 18 of the vehicle 16 to report updates to an administrator of the system 10. For example, in some embodiments, the controller 102 may further comprise one or more communication circuits 112 configured to communicate via a communication network 114. Accordingly, the system 10 may be in communication with a remote server 116 and/or a mobile device 118 via the communication network 114. The communication network 114 may comprise one or more wireless or wired network interfaces or communication protocols. As discussed herein, wireless communication protocols may operate in accordance with communication standards including, but not limited to, the Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multipoint distribution systems (LMDS); multi-channel-multi-point distribution systems (MMDS); RFID; and/or variations thereof. In this configuration, the controller 102 may be configured to send an alert or message to the administrator of the system 10 in response to one or more predetermined event. The alert or message may correspond to a text message, data message, or email alert via an application operating on a smart device, etc.

The electro-optic device 20 of the concealment apparatus 14 may correspond to an electrochromic element. The electrochromic element may comprise an electrochromic medium, which includes at least one solvent, at least one anodic material, and at least one cathodic material. Typically, both of the anodic and cathodic materials are electroactive and at least one of them is electrochromic. It will be understood that, regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration-Enhanced Stability, Process for the Preparation Thereof and Use in Electrochromic Devices," U.S. Pat. No. 6,519,072, entitled "Electrochromic Device"; and International Patent Application Publication Nos. WO 1998/42796 entitled "Electrochromic Polymeric Solid Films, Manufacturing Electrochromic Devices Using Such Solid Films, and Processes for Making Such Solid Films and Devices," and WO 1999/02621 entitled "Electrochromic Polymer System," which are herein incorporated by reference in their entirety.

According to one aspect of the present disclosure, a scanning apparatus configured to capture identifying information of a user includes one or more infrared emitters, at least one image sensor configured to capture image data in a field of view, and a controller is in communication with the scanning apparatus. The controller is configured to activate the one or more infrared emitters, control the at least one image sensor to capture a first image in the field of view, deactivate the one or more infrared emitters, control the at least one image sensor to capture a second image in the field of view, compare the first and second images, determine a set of pixels having a change from the first image to the second image, and process the set of pixels for identification of the user.

According to another aspect of the present disclosure, the change includes a reflection from the one or more infrared emitters.

According to another aspect of the present disclosure, the controller is configured to subtract the set of pixels having the change to determine a location of the user.

According to another aspect of the present disclosure, processing the set of pixels having the change for identification of the user includes an eye-scan-identification function.

According to another aspect of the present disclosure, the first image and the second image are captured over a predetermined temporal period.

According to another aspect of the present disclosure, the first image and the second image are consecutive images.

According to another aspect of the present disclosure, the scanning apparatus is incorporated in a vehicle.

According to another aspect of the present disclosure, comparing the first and second images includes the controller comparing a first set of pixels with a state of illumination and a second set of pixels with the state of illumination to determine a correlation of illumination.

According to another aspect of the present disclosure, comparing the first and second images includes the controller comparing a first set of pixels with a first state of illumination in the first image and a second set of pixels with a second state of illumination, having a lower intensity than the first state of illumination, in the second image to determine a correlation of illumination.

According to one aspect of the present disclosure, a scanning apparatus configured to capture identifying information of a user includes one or more infrared emitters, at least one image sensor configured to capture image data in a field of view, and a controller is in communication with the scanning apparatus. The controller is configured to modulate the one or more infrared emitters to activate and deactivate, control the at least one image sensor to capture a series of images in the field of view, compare the series of images in coordination with the modulation of the one or more infrared emitters, determine a set of pixels having a correlation with the modulation, and process the set of pixels for identification of the user.

According to another aspect of the present disclosure, the correlation indicates a relationship of a reflection from the one or more infrared emitters with a state of illumination over the series of images.

According to another aspect of the present disclosure, processing the set of pixels for identification of the user includes subtracting the set of pixels having the reflection to determine a location of the user.

According to another aspect of the present disclosure, processing the set of pixels for identification of the user further includes executing an eye-scan-identification function on the determined location of the user.

According to one aspect of the present disclosure, a scanning apparatus configured to capture identifying information of a user includes one or more infrared emitters, at least one image sensor configured to capture image data in a field of view, and a controller in communication with the scanning apparatus. The controller is configured to modulate the one or more infrared emitters to vary an intensity of illumination, control the at least one image sensor to capture a series of images in the field of view, compare the series of images in coordination with the modulation of the one or more infrared emitters, determine a set of pixels having a correlation with the modulation, and process the set of pixels for identification of the user.

According to another aspect of the present disclosure, varying the intensity of illumination of the one or more infrared emitters occurs over a period of time and determining a set of pixels having a correlation with the modulation includes having a correlation with a known state of illumination.

According to another aspect of the present disclosure, determining a set of pixels having a correlation with a known state of illumination includes determining a correlation greater than a predetermined threshold correlation.

According to another aspect of the present disclosure, varying the intensity of the illumination includes sinusoidally varying the intensity of illumination with a period of 4.5× that of a frame rate of the image sensor.

According to another aspect of the present disclosure, the scanning apparatus is incorporated in a vehicle.

According to another aspect of the present disclosure, the image sensor includes a graphic resolution of less than 10 megapixels.

According to another aspect of the present disclosure, the image sensor is disposed proximate a rear surface of an electro-optic device.

It will be appreciated that embodiments of the disclosure described herein may be comprised of one or more conventional processors and unique stored program instructions that control one or more processors to implement, in conjunction with certain non-processor circuits, some, most, or all of the functions of the system 10, as described herein. The non-processor circuits may include but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A scanning apparatus configured to capture identifying information of a user comprising:
    one or more infrared emitters;
    at least one image sensor configured to capture image data in a field of view;
    a concealment apparatus configured to selectively mask or hide the scanning apparatus in a concealed configuration and reveal a location of the scanning apparatus in a scanning configuration; and
    a controller in communication with the scanning apparatus, wherein the controller is configured to:
        activate the one or more infrared emitters;
        control the at least one image sensor to capture a first image in the field of view;
        deactivate the one or more infrared emitters;
        control the at least one image sensor to capture a second image in the field of view;
        compare the first and second images;
        determine a set of pixels having a change from the first image to the second image;
        subtract the set of pixels having the change from the image data in the field of view to determine a location of the user; and
        process the set of pixels for identification of the user.

2. The scanning apparatus according to claim 1, wherein the change comprises a reflection from the one or more infrared emitters.

3. The scanning apparatus according to claim 1, wherein processing the set of pixels having the change for identification of the user comprises an eye-scan-identification function.

4. The scanning apparatus according to claim 1, wherein the first image and the second image are captured over a predetermined temporal period.

5. The scanning apparatus according to claim 1, wherein the first image and the second image are consecutive images.

6. The scanning apparatus according to claim 1, wherein the scanning apparatus is incorporated in a vehicle.

7. The scanning apparatus according to claim 1, wherein comparing the first and second images includes the controller comparing a first set of pixels with a state of illumination and a second set of pixels with the state of illumination to determine a correlation of illumination.

8. The scanning apparatus according to claim 1, wherein comparing the first and second images includes the controller comparing a first set of pixels with a first state of illumination in the first image and a second set of pixels with a second state of illumination, having a lower intensity than the first state of illumination, in the second image to determine a correlation of illumination.

9. The scanning apparatus according to claim 1, wherein the concealment apparatus comprises a mirror device configured to reflect visible light depicting the user indicating an alignment with the scanning apparatus in the scanning configuration.

10. The scanning apparatus according to claim 1, wherein changing the concealment apparatus from the concealed configuration to the scanning configuration comprises adjusting a transmittance of an electro-optic device.

11. The scanning apparatus according to claim 10, wherein the location of the scanning apparatus is selectively revealed by the controller in the scanning configuration by controlling the transmittance.

* * * * *